United States Patent
Stanley et al.

(10) Patent No.: US 11,884,205 B2
(45) Date of Patent: Jan. 30, 2024

(54) MESSAGING SYSTEM

(71) Applicant: MOD WORLDWIDE, LLC, Philadelphia, PA (US)

(72) Inventors: John Stanley, Philadelphia, PA (US); Nina Stanley, Philadelphia, PA (US); Harsha Venna, Philadelphia, PA (US); Matthew Healy, Philadelphia, PA (US); Harshit Aggarwal, Philadelphia, PA (US)

(73) Assignee: MOD Worldwide, LLC, Philadelphia, PA (US)

( * ) Notice: Subject to any disclaimer, the term of this patent is extended or adjusted under 35 U.S.C. 154(b) by 0 days.

(21) Appl. No.: 16/245,220

(22) Filed: Jan. 10, 2019

(65) Prior Publication Data

US 2019/0212967 A1    Jul. 11, 2019

Related U.S. Application Data

(60) Provisional application No. 62/615,563, filed on Jan. 10, 2018.

(51) Int. Cl.
*B60Q 1/26* (2006.01)
*G06F 3/14* (2006.01)
*G06F 3/16* (2006.01)
*B60R 11/02* (2006.01)
*B60R 16/037* (2006.01)
(Continued)

(52) U.S. Cl.
CPC ............ *B60Q 1/268* (2013.01); *B60Q 1/50* (2013.01); *B60Q 1/5037* (2022.05); *B60R 11/00* (2013.01); *B60R 11/0229* (2013.01); *B60R 11/0235* (2013.01); *B60R 16/0373* (2013.01); *G06F 3/1454* (2013.01); *G06F 3/167* (2013.01); *B60Q 1/507* (2022.05); *B60Q 1/545* (2022.05); *B60Q 1/549* (2022.05); *B60R 2011/0008* (2013.01); *B60R 2011/0026* (2013.01);
(Continued)

(58) Field of Classification Search
None
See application file for complete search history.

(56) References Cited

U.S. PATENT DOCUMENTS 6,366,213 B2 * 4/2002 DeLine ................. B60K 35/00
340/815.4
7,659,808 B1 * 2/2010 Cooper ................. B60Q 1/503
340/425.5
(Continued)

OTHER PUBLICATIONS

"CarWink—Making the Road a More Connected Place," Innovart Design Inc. at Kickstarter.com, https://www.kickstarter.com/projects/503429569/carwink-making-the-road-a-more-connected-place (last visited Apr. 9, 2019).
(Continued)

*Primary Examiner* — Christopher R Lamb
(74) *Attorney, Agent, or Firm* — NIXON PEABODY LLP

(57) ABSTRACT

A messaging system includes a message board and a remote communicatively coupled to the message board and configured for receiving a user input. In the system, the remote is configured to transmit a message to the message board with instructions for displaying a message based on the user input. In some configurations, the messaging system can be installed in a vehicle. In such configuration, the message board can be communicatively coupled to an on-board diagnostics port of the vehicle.

20 Claims, 8 Drawing Sheets

(51) Int. Cl.
  *B60R 11/00* (2006.01)
  *B60Q 1/05* (2006.01)
  *G05D 1/02* (2020.01)
  *B60Q 1/50* (2006.01)

(52) U.S. Cl.
  CPC ............ *B60R 2011/0056* (2013.01); *B60R 2011/0059* (2013.01); *G05D 1/021* (2013.01)

(56) References Cited

U.S. PATENT DOCUMENTS

| | | | |
|---|---|---|---|
| 9,575,563 B1* | 2/2017 | Li .................... | G02B 27/0172 |
| 2005/0083183 A1* | 4/2005 | Cao .................... | B60Q 1/268 |
| | | | 340/426.13 |
| 2006/0164230 A1* | 7/2006 | DeWind ................ | B60K 37/06 |
| | | | 340/461 |
| 2007/0030139 A1* | 2/2007 | Ellison ................ | B60Q 1/503 |
| | | | 340/482 |
| 2010/0019479 A1* | 1/2010 | Haynes ................ | B60J 11/06 |
| | | | 280/770 |
| 2012/0098652 A1* | 4/2012 | Varella ................ | B60Q 1/503 |
| | | | 340/425.5 |
| 2015/0281436 A1* | 10/2015 | Kumar ................ | H04M 3/5166 |
| | | | 379/68 |
| 2016/0014273 A1* | 1/2016 | Joh .................... | B60R 16/0373 |
| | | | 455/563 |
| 2016/0089059 A1* | 3/2016 | Hu .................... | A61B 5/6892 |
| | | | 600/301 |
| 2016/0263996 A1* | 9/2016 | Gerlach ................ | B60N 2/797 |
| 2016/0332562 A1* | 11/2016 | Kim .................... | B60Q 1/0076 |
| 2017/0060523 A1* | 3/2017 | Hong .................. | G06F 3/165 |
| 2018/0297586 A1* | 10/2018 | Kim .................... | A61B 5/02405 |
| 2019/0130874 A1* | 5/2019 | Wafford ................ | B60K 35/00 |

OTHER PUBLICATIONS

"Screen Captures from Facebook Video Clip entitled Ototok—Your Voice on the Road," 5 pages, uploaded Jan. 18, 2017 by user "Ototok". Retrieved from internet <https://www.facebook.com/0T0T0K/videos/404743883207950/>.

* cited by examiner

MESSAGING SYSTEM

CROSS REFERENCE TO RELATED APPLICATIONS

This application claims domestic priority under 35 U. S. C. § 119 (e) to U.S. Provisional Patent Application No. 62/615,563, entitled "MESSAGING SYSTEM", and filed Jan. 10, 2018. The contents of that application are hereby incorporated by reference in their entirety.

FIELD OF THE INVENTION

The present disclosure relates to messaging system and methods, and more particularly, to systems and methods for enabling communication between a driver of a vehicle and persons in a surrounding area.

BACKGROUND

Aggressive driving and road rage are major concerns in America and threaten the safety of all road users. Communication is critical to solving road rage because it alleviates pre-cognitive bias, creates a sense of community, and reduces driver anonymity. Current methods for communicating between drivers include turn signals, hazard lights, horns, and flashing headlights—which provide limited, general utility but were not created to communicate the driver's specific intent. There are currently several models of remote-controlled displays that can be mounted to the rear windshield via suction cups. Some of these solutions are infrared-operated, and others use Bluetooth. All are manually controlled by the driver using either a hand-held remote or a mobile app. However, none of these display systems are integrated into the vehicle's systems; nor are they an effective means for reducing road rage.

For example, existing systems do not receive input from the vehicle and cannot generate display messages without active input from the user. Requiring a user to provide active input can impede a driver's ability to focus on the road and can, in fact, contribute to unsafe driving. Additionally, existing systems do not provide a variety of options for how a driver wishes to communicate.

Therefore, a road messaging system is needed that does not distract a driver and can effectively communicate with other drivers.

SUMMARY

Embodiments of the invention concern systems and methods for vehicle messaging systems. In a first embodiment of the vehicle messaging system, the system can include a message board and a remote. The remote and the message board can be communicatively coupled to each other. The remote can be further configured to receive user input and to produce a display message based on the user input. The remote can transmit the display message to the message board such that the message can be viewed by those outside the car.

In some examples of the first embodiment, the remote can be configured for receiving a verbal user input. The messaging system can further include a voice recognition system.

In some examples of the first embodiment, the remote can include a plurality of input buttons.

In some examples of the first embodiment, the remote can be communicatively coupled to an on-board diagnostic (OBD) port of the vehicle. The remote can read vehicle data via the OBD port. Based on the data read from the OBD port, the remote can transmit a message to the message board. The message can include instructions for displaying a message based on the vehicle data.

In some examples of the first embodiment, the remote can be communicatively coupled to the OBD port via a smartphone.

In some examples of the first embodiment, the OBD port can receive a variety of data. The data can include at least one of: vehicle speed, idle engine revolutions per minute (RPM), engine diagnostics, powertrain diagnostics, vehicle identification number, calibration identification number, ignition counter, emissions control system counters, fuel and air metering, air intake temperatures, coolant temperatures, throttle/petal position, fuel temperature, fuel composition data, fuel pressure, oil temperature, oil pressure, fuel injector performance, engine temperature, injection pump fuel metering, cylinder injection circuit monitoring, cylinder misfire detection, monitor crankshaft position, monitor ignition coils, braking data, anti-lock brake system monitoring, air bag status, power window position, global positioning system (GPS) location, door locked status, door unlocked status, hazard light status, headlight data, blinker data, horn status, steering data, seatbelt status, seat position, change in velocity, steering angles, radio and entertainment systems data, air conditioning system data, heating system data, emissions data, refrigerant pressure, power steering pressure sensor data, cruise control data, on-board computer process data, transmission control systems data, and/or any combination thereof.

In some examples of the first embodiment, the message board can include a light-emitting diode (LED) array, a liquid crystal display (LCD) array, a mini projector, and/or a hologram.

In some examples of the first embodiment, the system can further include a 360-degree camera. The 360-degree camera can be communicatively coupled to the remote. The 360-degree camera can be manually or automatically activated by a triggering event.

In some examples of the first embodiment, the vehicle can be operated autonomously.

In some examples of the first embodiment, the user input can include data from at least one of a: heart rate monitor, blood flow sensor, sweat sensor, respiratory rate monitor, pressure sensor, blood pressure monitor, blood glucose level sensor, electrocardiogram sensor, skin conductance sensor, accelerometer, camera, infrared temperature sensor, microphone, switches, and/or any combination thereof.

In some examples of the first embodiment, the system can further include a display device.

In some examples of the first embodiment, the system can include a 360-degree camera. The display device can provide a 360-degree camera view to the user and can allow the message displayed on the message board to be superimposed on the display device.

In some examples of the first embodiment, the display viewable on the message board can also be displayed on the rear view mirror of the vehicle.

In some examples of the first embodiment, the system can include a de-escalation protocol. The de-escalation protocol can be specific to an occupant of the vehicle and can provide for selecting at least one of: turning on and playing music and/or soothing sounds; setting a seat to a relaxing position; adjusting a temperature of a vehicle compartment; initiating a telephone call to a friend or a family member or designated contact of the occupant; activating a massage utility of a seat of the vehicle, activating an air ventilation system of a seat of a vehicle, and/or any combination thereof.

In some examples of the present disclosure, the system can include an automated pairing of a mobile device with the messaging system upon the mobile device entering the vehicle. For example, when a driver enters a vehicle with a smart phone, the driver's smart phone can automatically pair with the messaging system.

In some examples of the present disclosure, the system can further include on the display of the message board, at least one of: a weather report, road conditions, data from an OBD port of the vehicle, and/or data collected at a central server from similar messaging systems.

A second embodiment of the present disclosure provides for a method of operating a messaging system for a vehicle. The method can provide for first receiving verbal input via a voice recognition system in the vehicle. The verbal input can be from a user. The method can then provide for transmitting the verbal input to a central server. The method can then provide for interpreting the verbal input at the central server and processing the verbal input at the central server. The processing step can include initiating, approving, refining, or declining the spoken word or phrases. The method can also provide for displaying a message on a message board based on the processed verbal input, wherein the message board can display the message to be viewable outside of the vehicle. Various examples of the second embodiment can be as provided for with respect to the first embodiment.

In some examples of the second embodiment, the method can include using artificial intelligence to perform at least one of the interpreting step and the processing step.

A third embodiment of the present disclosure provides for an apparatus for operating a messaging system for a vehicle. The messaging system can be dependent on various user inputs. The system can include a non-transitory machine-readable storage medium and a processor. The non-transitory machine-readable storage medium can comprise instructions for operating the messaging system. The processor can be in communication with the non-transitory machine-readable storage medium. The processor can execute the instructions to cause a message to be displayed on a message board viewable from the exterior of the vehicle. The processor can execute the instructions based on user inputs. Various examples of the third embodiment can be as provided for with respect to the first and second embodiment.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The accompanying drawings exemplify the embodiments of the present disclosure and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 1:
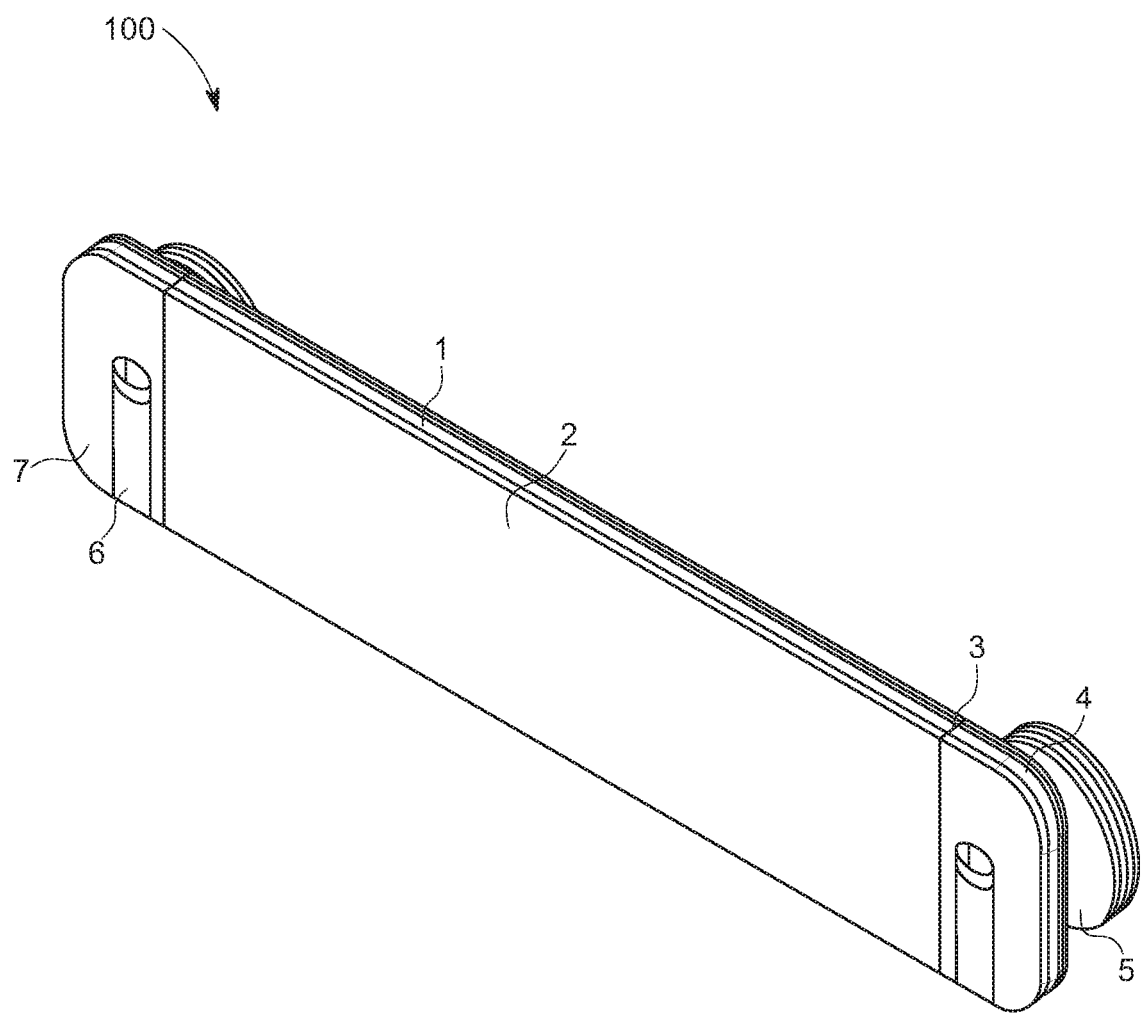
FIG. 1 is a schematic illustration of an embodiment of the LED board of the invention from the front isometric perspective.

The present disclosure is described with reference to the attached figures, where like reference numerals are used throughout the figures to designate similar or equivalent elements. The figures are not drawn to scale, and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present disclosure is not limited by the illustrated ordering of acts or events, as some acts may occur in different orders and/or concurrently with other acts or events. Furthermore, not all illustrated acts or events are required to implement a methodology in accordance with the present disclosure.

In view of the limitations of traditional vehicle messaging systems, the present disclosure is directed to systems and methods for enabling communication between a driver of a vehicle and persons in a surrounding area. In the various embodiments, a driver can provide inputs at a remote device, which are then translated and converted to an output on a message board, such as a light emitting diode (LED) message board. In certain embodiments, this communication can be enabled by using voice-recognition software to interpret a vocal user input at the remote, and translate the vocal user input into an output. In certain embodiments, the output message can be a de-escalating message or phrase selected using conflict resolution techniques, such as "sorry" or "my mistake" or "pardon me", and the like. This can be accomplished by taking a user's verbal input and processing using voice-recognition software. The words identified by the voice-recognition software can then be further processed to remove all words that have little or no meaning. Thereafter, the phrase with the most similar intent to the words in processed input can be located in a predefined library or database full of de-escalating phrases. Each of these de-escalating phrases can be designed to de-escalate aggressive situations. In some implementations, machine learning and/or artificial intelligence (AI) can be used generate a phrase or emoji to display. The generated phrase can be based on input from the user or the vehicle.

In some implementations, the remote and the message board can be coupled to the vehicle electronics, such as via the on-board diagnostics (OBD) port of a vehicle. This can integrate the system into the vehicle, potentially allowing for use of the hands-free functionality of the vehicle's systems, and enabling automated transmission of relevant messages to be sent to the board. In addition, the system can receive notifications via the OBD port when certain events are triggered, and automatically send an appropriate message to the board. For example, if the rear wheels start to slip, and a traction control system is triggered on the car, the activation of the traction control system can be communicated via the OBD port to the message board. In response, the message board can be configured to display an appropriate message to warn surrounding people, as discussed below in greater detail.

FIGS. 1 through 4 show the components of an exemplary system in accordance with the various embodiments, namely a system consisting of a LED message board 100 and its attachment mechanisms as well as an associated remote 200. The message board 100 can alternatively comprise a light-emitting diode (LED) array, a liquid crystal display (LCD) array, a mini projector, and/or a hologram.

Although the various examples will be described with respect to a car, the present disclosure is not limited in this regard, and can be adapted for use with any vehicle or mode of transportation, such as boats, bicycles, motorcycles, scooters, hoverboards, skateboards, and the like. Additionally, although the present disclosure discusses vehicles with respect to a driver-operated car, the present disclosure contemplates that the same messaging system can be operated in a driver-less car, or an autonomously operated vehicle.

Figure 2:
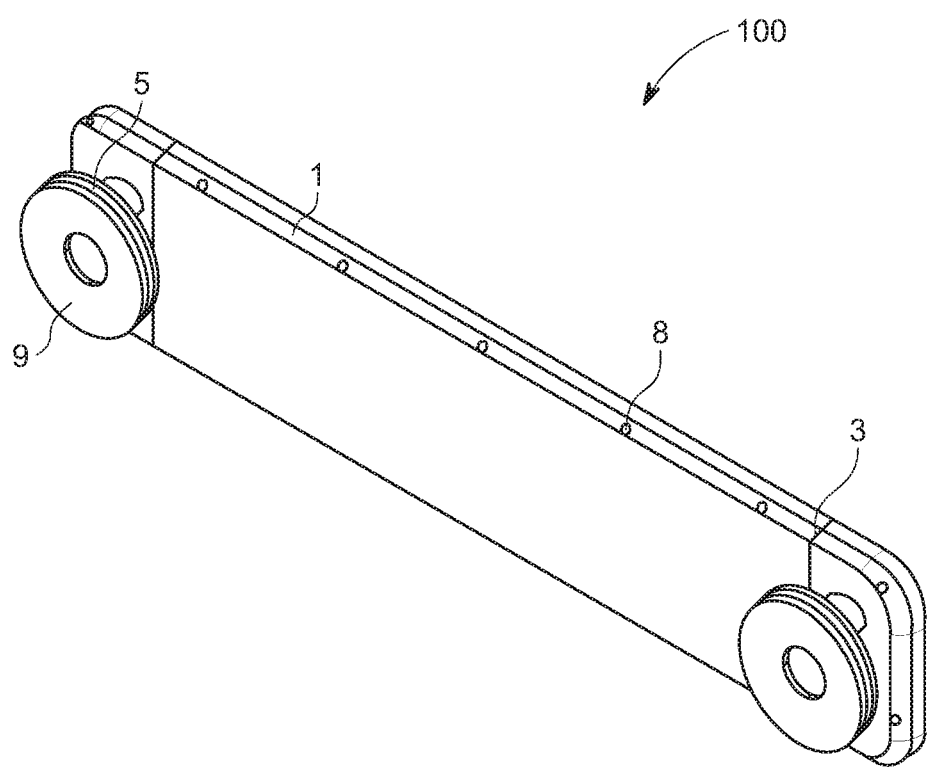
FIG. 2 is a schematic illustration of an embodiment of the LED board of the invention from the rear isometric perspective.

FIGS. 1 and 2 show both sides of the LED message board 100, as well as a mechanism for attaching the LED message board 100 to the rear window of the car. In the exemplary configuration of FIGS. 1 and 2, LED message board 100 includes: a LED board enclosure 1; a glass cover 2; a parting line 3; a flap enclosure 4; a suction cup housing 5; a suction cup latch 6; a front fascia 7; a screw hole 8; and suction cups 9. As shown in FIG. 1, the LED message board 100 includes suction cups 9, which can be pressed against the glass of the window, and will generate enough suction force to support the weight of the LED message board 100. In some embodiments of the present disclosure, the LED message board 100 can be connected to the windshield through double-sided foam tape, adhesives, magnets, and/or other similar connectors as known in the art, instead of suction cups 9. Although the present disclosure shows the LED message board 100 attached to a rear window, the present disclosure contemplates that the LED message board 100 can be placed near any car window or opening such that the display is viewable by persons outside the car.

Figure 3:
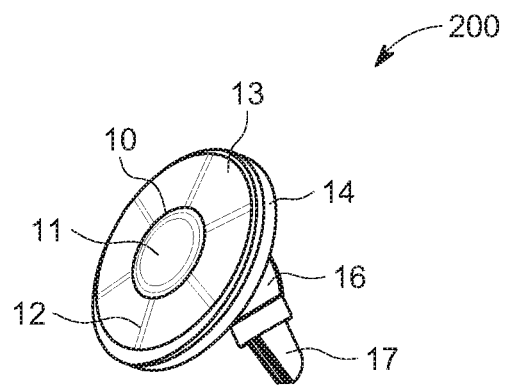
FIG. 3 is a schematic illustration of an embodiment of the remote with six side buttons from the front isometric perspective.
Figure 4:
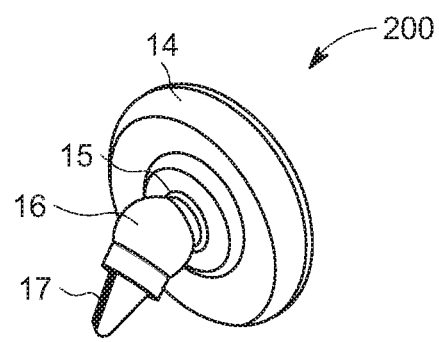
FIG. 4 is a schematic illustration of an embodiment of the remote showing an attachment mechanism between the remote and the A/C vent of the car from the rear isometric perspective.

FIGS. 3 and 4 show two views of the remote 200, namely a front isometric view and a rear isometric view, respectively. As shown in FIGS. 3 and 4, the remote 200 includes: an LED ring 10; a center button 11; the divider 12; a side button 13, a remote enclosure 14; a magnetic ring 15; a metal sphere 16; and an A/C vent clip 17. The remote 200 can be attached to the car through an A/C vent clip 14, which can snap into the front A/C vent of the car next to the driver. As shown in FIG. 3, the remote 200 additionally can have several buttons (11, 13) which allow the driver to select pre-designated responses for the LED message board 100.

In operation, a user provides an input at remote 200 via buttons 11 and 13. A corresponding message is generated on LED board enclosure 1, and shines through glass cover 2 and through the glass of a window of a vehicle. Therefore, the LED board 100 can be viewed by persons outside of the vehicle.

Although a particular design of a remote 200 is shown in FIGS. 3-4, the present disclosure contemplates that a variety of designs or objects can be used as a remote, so long as the remote is configured to receive user input. In some embodiments of the present disclosure, the remote 200 can be a mobile device. For example, a user's phone can automatically pair with a messaging system 100 upon entering a vehicle. The phone can then operate as the remote 200. Such automatic pairing can occur via Bluetooth, Wi-Fi, other wireless pairing, or a wired connection.

Figure 5:
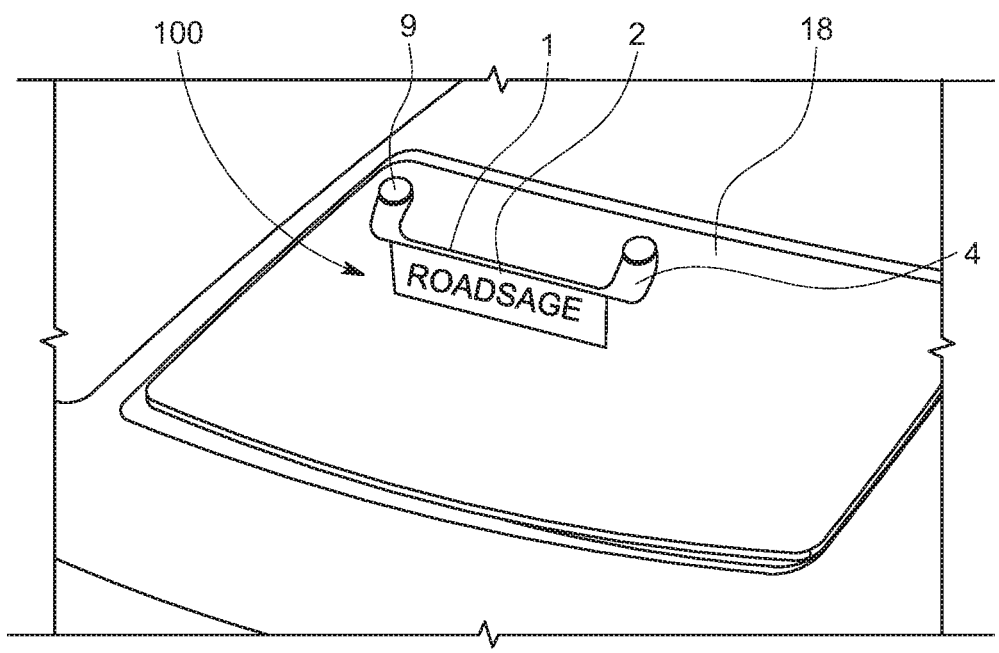
FIG. 5 is a perspective view showing the LED board of the invention mounted to the rear window of a car, as viewed from the exterior of the car.
Figure 6:
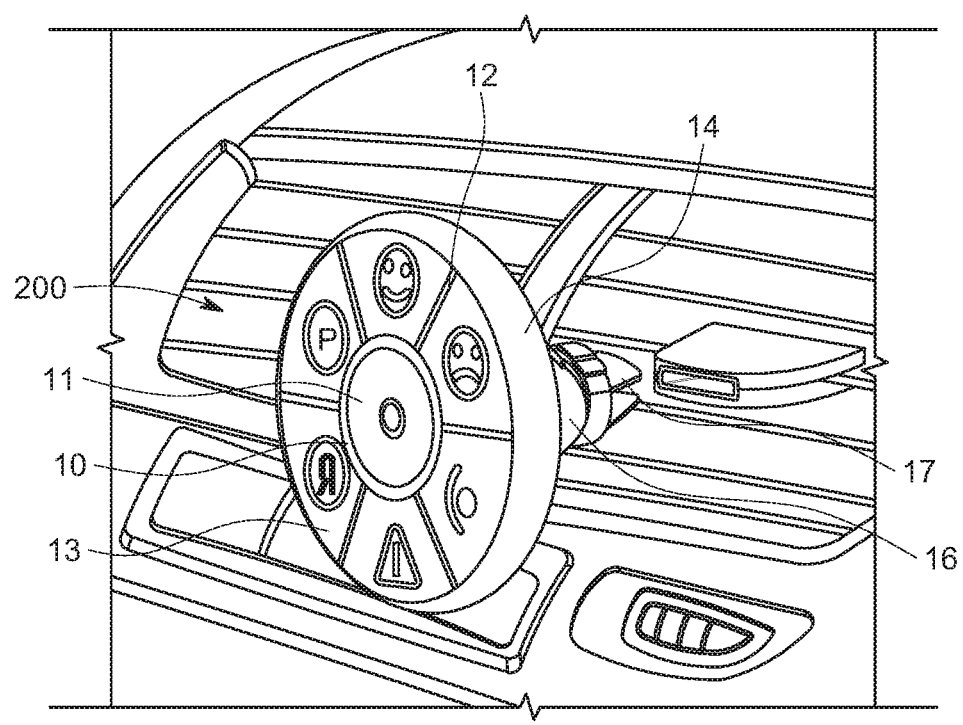
FIG. 6 is a perspective view showing the remote of the invention mounted to the dashboard of the car.

FIGS. 5 and 6 show an exemplary mounting of the LED message board 100 and the remote 200 to the rear window of the car and the dashboard of the car, respectively. In particular, FIG. 5 shows a possible position for the LED message board 100 to be placed in the rear window 18 of the car. The LED message board 100 can lay perpendicular to the ground so that the driver of another car can read the LED message board 100 with ease.

FIG. 6 shows the location of the remote 200 in the car. FIG. 6 also depicts several possible pre-designated messages associated with the buttons 11 and 13, such as a happy face, a sad face, and a warning signal. The present disclosure contemplates a wide range of pictorial elements can be used as exemplary buttons on the remote 200. The remote 200 in FIG. 6 shows six possible pre-selected buttons that the driver can press on to send an automated message to the LED board without having to use the voice-control function of the invention. However, the various embodiments are not limited to any number of buttons.

Figure 7:
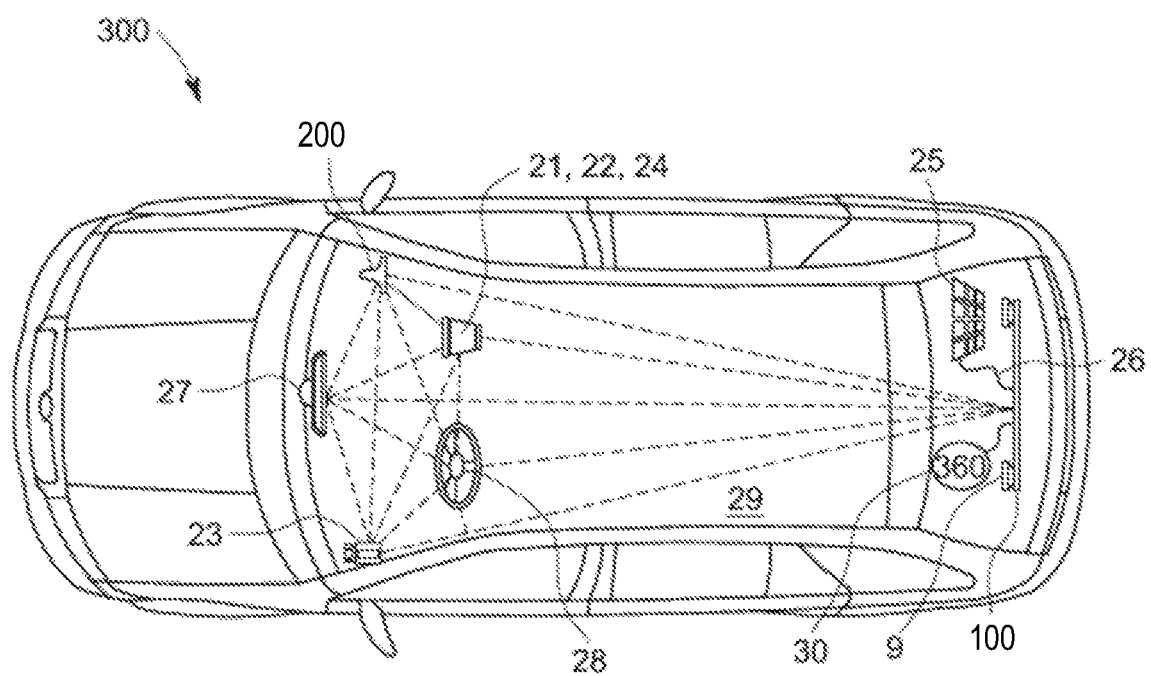
FIG. 7 is a perspective showing the top view of a typical car and where the components of the invention would be located in a car.
Figure 8A:
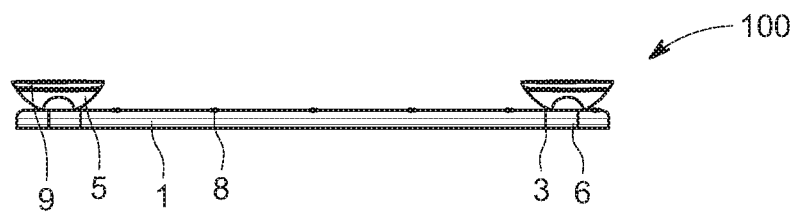
FIG. 8A-8D are schematic illustration of the LED board showing the orthographic drawings from top, bottom, left, and right sides, respectively.
Figure 8B:
Figure 8C:
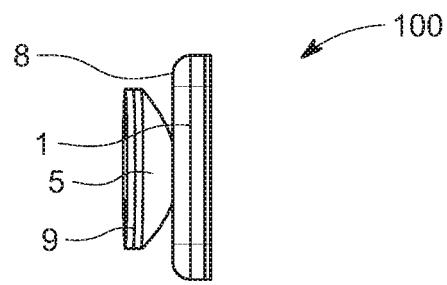
Figure 8D:
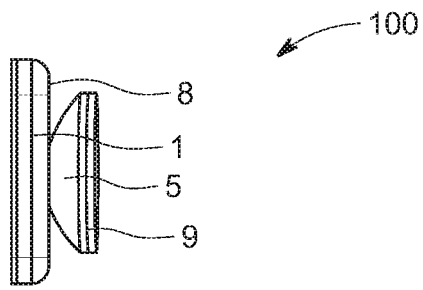

FIG. 7 shows an exemplary system 300 in its entirety. In particular, system 300 is illustrated as installed in a car. As shown in FIG. 7, this system 300 includes LED message board 100, the remote 200, other components. These other components include a data transfer component 21, a smartphone 22, an OBD port 23 (in the car), data transmitter 24, a solar panel 25, an electrical cord 26 coupling the solar panel to the LED message board 100; a smart mirror 27, a steering wheel 28, data transmission pathways 29, and a 360-degree camera 30. In FIG. 7, the data transmissions are sent via Bluetooth or other communication protocols and methods, including wired or wireless communication protocols and methods (as shown by data transmission pathways 29 between the various components).

In operation, the remote controller 200 can be put in the A/C vent. A data transfer component 21 can be located on either side of the remote controller 200, or can be part of the remote controller 200. Additionally, an OBD port 23 can be located at the driver's side of the car. These components will capture the driver's input, produce de-escalating messages when needed, and transmit the signal to the LED message board 200 in the rear window. A solar panel 25 can be placed in the rear window of the car, and attached to the LED message board 200 to power the LED message board 200.

The LED message board 200 can then display the message based on the input of the driver via remote 200. The LED message board 200 can be powered from the solar panel 25. While the message board 200 can be powered by the vehicle electrical system, it can also be operated by other forms of power. These other forms of power can include rechargeable batteries (separate from the electrical system of the vehicle) or a power bank. Recharging of these batteries or power bank can be performed by solar power, wing power, inertial power of the vehicle upon operation (especially when slowing down) or by conventional electrical power (plug-in).

Connectivity to the OBD port 23 allows for hands-free, automated transmission of relevant messages to be sent to the LED message board 100 and displayed to others, such as drivers in another vehicle. The LED message board 100 can support functionality by both wired and wireless communication. Wireless communication can include radio frequency and Bluetooth. Other wireless communications such as WI-FI, RFID, NFC, and Z-wave can also be used instead of Bluetooth. Further, other wireless communication technologies such as infrared (IR) can be used instead of radio frequencies. However, the present disclosure contemplates that any other communication technologies can be used without limitation, to yield the data transmission pathways 29.

Any device capable of performing logic operations can be used instead of a remote controller 200. The remote controller 200 can be as discussed above with respect to FIGS. 3-4.

In some configurations, the remote controller 200 can also include a 360-degree dash camera which activates based on a triggering event. For example, the camera can be automatically triggered when the vehicle is involved in a collision recording everything from before to after the collision.

A 360-degree camera could also be located in another component of the system 300 or as a stand-alone component (for example, 360-degree camera 30). In such configurations, the 360-degree camera 30 can be communicatively coupled to the remote controller 200 using any of the communications technologies discussed herein. Further, such coupling can be direct or indirect, such as via the OBD port 23 or any other components in the vehicle.

In some configurations, the remote controller 200 can include a screen on the remote controller 200 or a separate display device elsewhere in the car. The screen can be linked to the 360-degree camera 30, to offer the driver a broad view of the exterior environment behind the car. The screen can also function as a remote (for example, having a touch screen simulating preset buttons). A selected message can superimpose on top of the camera view for a short period of time—thereby providing verification to the driver that a selected message was successfully transmitted to the LED board 1. In some examples, the separate display device can also serve as the primary remote controller 200 or a second remote controller. The screen on the remote controller can be any screen for viewing text or pictures, including, but not limited to, LED, LCD, OLED, PLED, plasma, or E-ink screens.

In some configurations, the messaging system 300 can include a smart mirror 27. This smart mirror 27 can be one embodiment of the separate display device discussed above. The smart mirror 27 can be part of the rear-view mirror of the vehicle, and can allow the driver to send messages and receive feedback. Messages can be sent according to data collected by sensors located on the smart mirror 27, or according user input from buttons on the smart mirror 27. In some examples of the present disclosure, the smart mirror 27 can act as the remote controller 200, as discussed earlier with respect to FIGS. 3-4.

An embodiment of the remote controller 200 can be integrated with the steering wheel 28 or be a steering wheel cover. This cover can include the buttons of the standard remote controller 200 (as shown in FIGS. 3-4), along with sensors, to get biological data from the driver. Sensor data can be collected and analyzed as discussed further below.

In the preceding figures, the LED message board 100 is shown as a rectangular LED display board which can be solar powered. However, other variations thereof are contemplated in the various embodiments. For example, other shapes are contemplated for message boards 100 in accordance with the various embodiments. Further, the message boards 100 according to the various embodiments can also be powered through an electric battery or power bank. Additionally, message boards 100, in accordance with various embodiments of the present disclosure, can have other types of connectors in addition to or in place of the suction cups 9 to hold the LED message board 100 board to the rear window. Suction cups or other connector types can be screwed onto a message board 100. In some embodiments, a message board 100, can have a power-on mechanism such as a mechanical switch that activates upon rapid acceleration. Also, the message board 100 can support functionality by both wired and wireless communication and/or can work with the inbuilt OBD port. Additionally, other display technologies such as LCD, plasma, OLED, E-ink, and PLED can be used in place of the LED matrix.

FIGS. 8A-8D show detailed views of the LED board 100. As shown in FIG. 8, the LED board 100 can include an LED board enclosure 1; a glass cover 2; a parting line 3; a suction cup housing 5; a suction cup latch 6; a screw hole 8; and a suction Cup 9. In the configuration of FIGS. 8A-8D, the LED board 100 is a rectangular board which can be solar powered. It could also be powered through an electric battery or power bank (not shown) as previously described. The board 100 might have suction cup connectors 9 which would hold the LED board 100 to the rear window. The board 100 can have a power-on mechanism such as a mechanical switch that activates upon rapid acceleration. The suction cups 9 could be screwed onto the LED board 100. The LED board 100 can support functionality by both radio frequency and Bluetooth and can integrate with the inbuilt OBD port. Other display technologies such as LCD, Plasma, OLED, and PLED can be used in place of the LED Matrix. Some examples of the LED board 100 can also include a flap enclosure or a front facia.

Although the LED board 100 is shown to be rectangular, the present disclosure contemplates that an exemplary LED board 100 can be any shape and size. For example, the present disclosure contemplates that an exemplary LED board 100 can be circular, oval, square, triangular, or other polygonal or non-polygonal shapes.

Figure 9A:
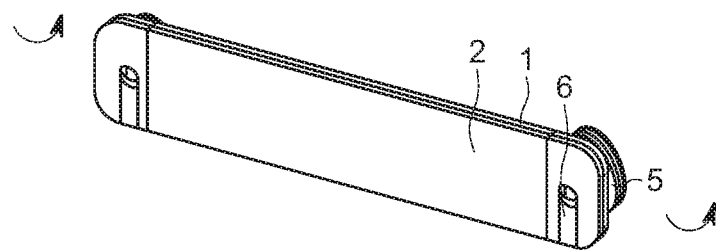
FIGS. 9A-9D are a perspective views showing an embodiment of the LED board with the flap rotational ability of the LED board showing how the LED board can hang at various angles
Figure 9B:
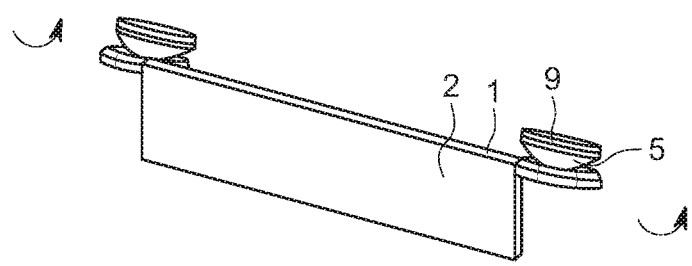
Figure 9C:
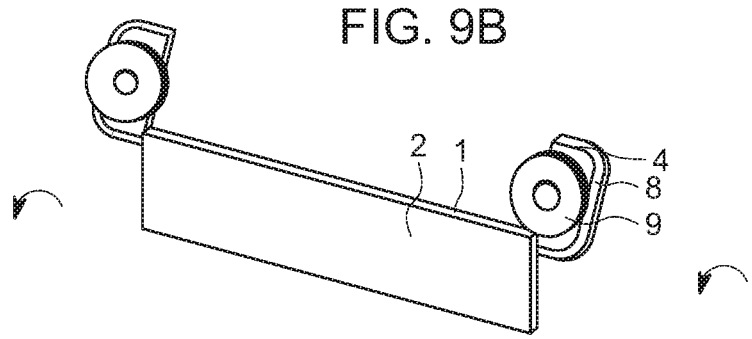
Figure 9D:
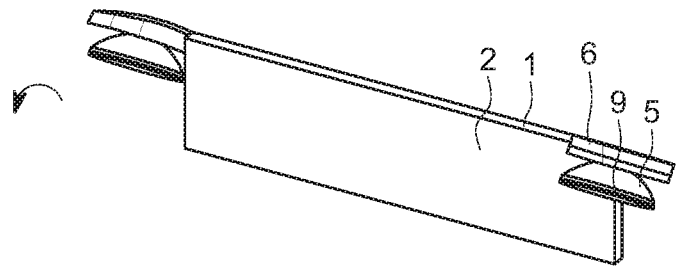

FIGS. 9A-9D show the friction hinges and swivel capability of the LED message board 100. The LED message board 100 can be locked in place at any angle. Additionally, some configurations allow motors to automatically adjust the board 100 to the ideal tilt angle for the highest visibility in sunlight or other environmental conditions. FIG. 9 shows exemplary illustrations of a normal fit (FIG. 9A), a 90-degree angle (FIG. 9B), a 170-degree angle (FIG. 9C), and a 250-degree angle (FIG. 9D). However, the LED message board 100 is not limited to any particular angle; rather, it can be set at whatever angle allows for easiest reading in the various embodiments. Torsion hinges, magnets, and other mechanical devices like a ball and socket joint can be used instead of the friction hinges. In some examples of the present disclosure, the messaging system can provide for setting an LED message board display angle remotely. In some cases, this can occur by a selection on the remote controller 200.

Message Content & Content Transformation

In addition to the foregoing, additional features can be added to message boards in accordance with the various embodiments. In certain implementations, an LED message board can be mounted to the rear windshield of a car, and controlled by a dedicated remote and/or a Bluetooth-enabled smartphone app featuring voice-recognition. The dedicated remote and smartphone app can send messages to the board. Messages can be transmitted wirelessly and/or through wired connections. In particular, the voice-recognition software will interpret what the user is trying to say and process the verbal input into a de-escalating phrase using conflict resolution techniques. As noted previously, this translation can be done using a machine learning process or an artificial intelligence (AI) that matches the best de-escalating phrase in a databased to the user's verbal input. As also noted above, this can also include performing pre-processing of the verbal input to remove words with little or no meaning.

In some examples, if the remote controller 200 is connected to the internet, the driver can provide any verbal input. The verbal input can be captured by the messaging system (for example, at a microphone on the controller) and then sent to a remote server, via the Internet, wireless communication, Bluetooth, and the like. The verbal input can be evaluated based on machine-learning techniques, as known in the art, to determine whether the message should be approved/refined/declined. For example, a message involving profanity can be declined. A message which is unclear can be clarified at the remote server, or a message that is harsh can be softened at the remote server. Refining the message can also include removing words with little or no meaning and paraphrasing the message to make the intent clear. After evaluating the message at the remote server, the message can be sent back to the messaging system (e.g. system 300), and be displayed on the message board (e.g. board 100).

In another configuration, emoji might be used in place of standard messages to convey the driver's intent. This has the advantage of not requiring others to understand the driver's language—since emoji are independent of languages spoken and universally understood. Emoji would be selected in a manner substantially similar to selection of a message based on voice input. That is, each emoji is assigned some meaning and an emoji is selected, via machine learning or AI, that has a meaning closest to that of the voice input. In certain implementations, multiple emoji can be selected, based on the number of concepts that need to be communicated.

Moreover, in some implementations, emoji and words can be combined. In some cases, the combination can be selected so as to minimize the amount of content displayed on the LED message board. In other cases, the emoji can be selected to further de-escalate or otherwise enhance communication with other persons. For example, an apologetic emoji can be added to the end of the message to more effectively communicate to other persons that the driver recognizes that he committed an error during driving. In another example, a smiley-face emoji can be added to the end of a message to thank another driver for allowing a merge or lane change so as to more effectively communicate gratitude.

OBD Port Integration

In other configurations, use of the OBD port can be used to automate driver-to-driver communication. The OBD port can receive data from the vehicle itself and can receive data passively from a driver. For example, the OBD port can determine a position of the steering wheel, an amount of accelerator and brake applied, a seat position, driving dynamics, air conditioner data, car audio volume, and other data on interactions between the driver and the vehicle. The messaging system can determine a message to display based on any combination of this data.

For example, under certain detectable traffic or weather conditions, messages can be automatically displayed. For example, if adverse weather conditions are detected, the message board can automatically display the message "slippery road—please keep distance." This might reduce rear-end collisions.

In operation, the OBD port can provide information from different systems in the vehicle. For example, the OBD port can provide information on various vehicle parameters, including the list below:

Vehicle Speed
Engine Idle RPM
Engine Diagnostics
Powertrain Diagnostics
Vehicle Identification Number
Calibration Identification Number
Ignition Counter
Emissions Control System Counters
Fuel and Air Metering
Air intake temperatures
Coolant Temperatures
Throttle/Petal Position
Fuel Temperature
Fuel Composition data
Fuel Pressure
Oil Temperature
Oil Pressure
Fuel Injector performance
Engine Temperature
Injection Pump Fuel Metering
Cylinder injection circuit monitoring
Cylinder misfire detection
Monitor crankshaft Position
Monitor Ignition Coils
Braking data
ABS system monitoring
Air Bag status
Power window position
GPS location (if vehicle is equipped with gps)
Doors locked or unlocked
Hazard light status
Headlight and blinkers on/off data
Horn status
Steering data
Seatbelt status
Seat position
Change in velocity
Steering angles
Radio and entertainment systems data
AC and Heating systems data
Monitor Emissions
   Exhaust Gas
   Air injection systems
   Catalyst Efficiency
   Evaporative Emission Control
   Fuel level
   Purge level Exhaust Pressure
Cooling Fan circuit functionality
A/C Refrigerant Pressure
Power steering pressure sensor
Cruise control data
On Board Computer Processor Data
Transmission control systems data
  Transmission temp
  Transmission fluid temp
  Output speed sensor
  Gear ratio data
  Torque converter clutch data
  Shift solenoid data Any combination of the above information can be received from the OBD port for the purposes of the present disclosure. As would be known by a person skilled in the art, not all vehicles provide the same information from an OBD port, but the present disclosure contemplates integrating the message board with whatever information is available from the OBD port.

This information from the OBD port can then be used to generate an appropriate warning message for surrounding persons. For example, if the rear wheels of the car start to slide and the traction control system is triggered on the vehicle, the activation of the traction control system can be communicated via the OBD port. In response, the LED message board can be configured to display an appropriate message, such as "Caution, Slippery Road." In some implementations, such messages can pre-defined for certain types of information obtained via the OBD port. However, in other implementations, the messages can be identified using machine learning or AI. For example, the information via the OBD port may be combined with information from other sources (e.g., weather reports or status of windshield wipers). Thus, if the traction control system is activated, the weather reports indicate rain, and the windshield wipers are activated, the message could read "Caution, Road Wet, and Slippery." Similarly, messages can be generated for other conditions via aggregation of information from multiple sources. These messages can be displayed automatically without driver interaction or use of the remote controller.

In some examples of the present disclosure, OBD data from the car along with other user input (e.g. verbal input, sensor data, or input received at the remote controller 200). The user input and the OBD data can be analyzed to predict user behavior, and, in turn, can be shared with a remote server for further analysis.

In some examples, the remote 200 can be communicatively coupled to the OBD port via a smart phone or mobile device. For example, a mobile device can be physically and communicatively coupled with the OBD port while the remote 200 is communicatively coupled with the mobile device.

Driver Communication with Messaging System

In another configuration, the driver might rely on the remote controller's buttons with pre-selected responses to send to the LED board and receive some type of confirmation. For example, the remote might have an LED confirmation sequence where the button would light up blue (or any other color) when the driver presses. In some particular configurations, the light can sequentially fill a circle to show that the message is sending. The circle fades to black while the pressed button fades to green to show the message is being displayed. The button will remain green, and then fade to black to indicate when the message has stopped scrolling. However, if the message fails to send, the center ring can also light up red to alert the user of the error.

In another configuration, the driver can use a smartphone app instead of the remote controller to send relevant messages to the LED board. The smartphone app can be OBD compatible, and can automatically send the message to the LED board based on data received from OBD.

Sensor Usage

In some configurations, the system can also be used to generate messages automatically based on the driver's mood or stress levels. This can be accomplished by providing sensors configured to monitor the driver, and provide data that can be used to detect times when the user is stressed or angry. If such events are detected, the LED message board can be configured to display messages indicating the state of the driver as a warning to others. For example, in some implementations, a steering wheel can be equipped with force sensors that measure force in the driver's grip. Thus, if the force is high, a determination can be made that the driver is stressed or angry, and an appropriate message can be generated. In another example, cameras and facial recognition software can be provided to view and evaluate the driver's expressions. Thus, if the driver's expressions indicate stress or anger, a determination can be made that the driver is stressed or angry, and an appropriate message can be generated. In still another example, the driver may be wearing a smartwatch or other wearable device capable of monitoring biological functions. Thus, it the measurements via the wearable device correspond to an angry or stressed state, an appropriate message can be generated. However, the present disclosure contemplates that any other means for detecting driver emotion or alertness on the part of the user can be used in the various implementations.

In some examples of the present disclosure, the messaging system can determine whether the driver is falling asleep at the wheel, based on biometric data and OBD port data collected by the messaging systems. The messaging system can then provide for certain events, such as a small jolt from the smartwatch, increasing the music volume, or displaying a message saying suggesting that the driver stop for coffee.

The present disclosure contemplates that the messaging system can produce a message based on input from sensors. In some instances, sensors can be on a steering wheel of the vehicle, a seat of the vehicle, attached to the driver (for example on a watch or wristband), or other combination or location as known in the art. Exemplary sensors can include contact sensors and contactless sensors.

Exemplary contact sensors can include a heart rate monitor, blood flow sensors, cutaneous blood flow sensors, sweat sensors, a cortisol sweat sensor, a respiratory rate monitor, a temperature sensor, a pressure sensor, a blood pressure monitor, a blood glucose level sensor, an electrocardiogram sensor, a skin conductance sensor (for example, to measure a driver's fight or flight responses), an accelerometer (for example, to detect rapid movements in the vehicle), and any combination thereof.

Exemplary contactless sensors can include cameras, infrared temperature sensors, and microphones. For example, cameras can collect data on a user's expression. Driver expression data can be transmitted to a server where the data is analyzed to determine an emotion of the driver. Emotions of the driver can be determined at the remote server, for example, based on dilation of the pupils, rapid movement of the user, or other non-verbal body language of the driver. An infrared temperature sensor can detect a rising temperature of the driver to detect anger. A microphone can be used to collect data on the user's voice. Similar to the process of evaluating driver expression data, driver voice data can also be transmitted to a server for analysis. Emotion of the driver can be determined, by a tone, a volume, a frequency of speaking, or other verbal cues of the driver. The present disclosure contemplates that these contactless sensors can be placed anywhere in the vehicle.

In some examples of the present disclosure, these sensors can further determine an alertness of the driver. For example, cameras can pick up on where a driver is looking, whether a driver is squinting, where a driver's eyes are focused, whether a driver is moving around, or any other driver action.

De-Escalation Protocol to Manage Driver Emotions

Some embodiments of the present disclosure can provide for a de-escalation protocol to manage the emotions of the driver. For example, data on driver emotion can be collected as discussed above with respect to the sensors. When a driver is detected to be upset or distressed, an exemplary de-escalation protocol, according to an embodiment of the present disclosure, can automatically be triggered by the messaging system 300 or can be manually instigated by the driver.

Such a protocol can provide for displaying a certain message on the LED board, playing the driver's favorite music, setting the seat to a relaxing position, tweaking the air conditioning system, calling friends/family, turning on the massage and air ventilation systems in the seat, and any combination thereof or similar actions designed to calm a driver.

Preventative Warning System

In some embodiments of the present disclosure, an exemplary messaging system can integrate with externally provided data related to weather, road conditions, or other data that can impact how a driver chooses to drive. For example, the messaging system can be configured to connect to the Internet and receive data from a remote server. The data can include information on weather, road conditions, maps/navigation, or data from a database for a group of users using similar messaging systems. This data can be integrated with data that is local to the messaging system, such as the OBD port and sensor data (as discussed earlier). The integrated data can be used to provide the driver with warnings and notifications. A corresponding message can be displayed on the LED board 100. For example, if icy roads are expected, the driver can be informed before they start to drive, and the LED board 100 can indicate to other drivers to "Keep distance due to icy road conditions."

While various examples of the present disclosure have been described above, it should be understood that they have been presented by way of example only, and not limitation. Numerous changes to the disclosed examples can be made in accordance with the disclosure herein without departing from the spirit or scope of the invention. Thus, the breadth and scope of the present disclosure should not be limited by any of the above described examples. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular examples only and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A messaging system for a vehicle, comprising:
a remote removably positionable within the vehicle and configured to:
receive user input, wherein the user input has at least a verbal portion;
determine, based on the verbal portion, content of the user input;
in response to determining that the content of the user input is escalatory, select, based on the content of the user input, a de-escalating phrase that corresponds to the escalatory content of the user input;
cause a message board to display the de-escalating phrase;
in response to determining that the content of the user input is not escalatory, select, based on the content of the user input, a predefined message from a database of predefined messages, wherein the predefined message matches the content of the user input;
generate, based on the predefined message, a display message; and
cause the message board to display the display message;
the message board, wherein the message board is removably positionable within the vehicle, wherein the message board is spaced apart from the remote, and wherein the message board is communicatively coupled to the remote to receive the display message and present the display message to be viewed from outside the vehicle; and
a display device positionable within the vehicle to be viewed by a user within the vehicle, wherein the display device is spaced apart from the message board and the remote, and wherein the display device is communicatively coupled to the remote to receive the display message and present the display message to be viewed by the user within the vehicle.

2. The messaging system of claim 1, wherein the predefined message is selected based on a machine learning algorithm.

3. The messaging system of claim 1, wherein the remote further comprises a plurality of input buttons.

4. The messaging system of claim 1, wherein the remote is communicatively coupled to an on-board diagnostic (OBD) port of the vehicle and configured to read vehicle data via the OBD port, and wherein the remote is configured to automatically generate the display message using the vehicle data.

5. The messaging system of claim 4, wherein the remote is communicatively coupled to the OBD port via a smartphone.

6. The vehicle of claim 4, wherein the vehicle data comprises at least one type of data selected from the group consisting of: vehicle speed, idle engine revolutions per minute (RPM), engine diagnostics, powertrain diagnostics, vehicle identification number, calibration identification number, ignition counter, emissions control system counters, fuel and air metering, air intake temperatures, coolant temperatures, throttle/petal position, fuel temperature, fuel composition data, fuel pressure, oil temperature, oil pressure, fuel injector performance, engine temperature, injection pump fuel metering, cylinder injection circuit monitoring, cylinder misfire detection, monitor crankshaft position, monitor ignition coils, braking data, anti-lock brake system monitoring, air bag status, power window position, global positioning system (GPS) location, door locked status, door unlocked status, hazard light status, headlight data, blinker data, horn status, steering data, seatbelt status, seat position, change in velocity, steering angles, radio and entertainment systems data, air conditioning system data, heating system data, emissions data, refrigerant pressure, power steering pressure sensor data, cruise control data, on-board computer process data, transmission control systems data, and combinations thereof.

7. The messaging system of claim 1, wherein the message board comprises at least one selected from the group consisting of: a light-emitting diode (LED) array, a liquid crystal display (LCD) array, a mini projector, and a hologram.

8. The messaging system of claim 1, wherein the user input is received from a type of sensor selected from the group consisting of: a heart rate monitor, a blood flow sensor, a sweat sensor, a respiratory rate monitor, a blood pressure monitor, a blood glucose level sensor, an electrocardiogram sensor, a skin conductance sensor, and combinations thereof.

9. The messaging system of claim 1, wherein the display device is combined with a rear view mirror of the vehicle.

10. The messaging system of claim 1, further comprising a de-escalation protocol for an occupant of the vehicle, wherein the de-escalation protocol is at least one selected from the group consisting of: initiating a telephone call to a friend or a family member or designated contact of the occupant; activating a massage utility of a seat of the vehicle; and combinations thereof.

11. The messaging system of claim 1, further comprising causing at least one additional type of information to be displayed on the message board, the at least one additional type of information being selected from the group consisting of: weather reports, road conditions, data from an on-board diagnostic port of the vehicle, and data collected at a central server of a different messaging system.

12. The messaging system of claim 1, wherein the display message comprises an emoji selected from the group consisting of a happy face and a sad face.

13. The messaging system of claim 1, wherein the remote is removably couplable to the vehicle.

14. The messaging system of claim 1, further comprising a camera configured to capture a camera view of an exterior environment behind the vehicle, wherein the display device is communicatively coupled to the camera to display the camera view, and wherein the display device is configured to present the display message by superimposing the display message over the camera view.

15. The messaging system of claim 14, wherein the camera is a 360-degree camera, and wherein the display device provides a 360-degree camera view to the user.

16. A method of operating a messaging system for a vehicle, the method comprising:
receiving user data from a sensor selected from the group consisting of a heart rate monitor, a respiratory rate monitor, a blood pressure monitor, and combinations thereof;
receiving verbal input via a voice recognition system in the vehicle;
in response to determining that content of the verbal input is escalatory, selecting, based on the content of the verbal input, a de-escalating phrase that corresponds to the escalatory content of the verbal input;
causing the de-escalating phrase to be displayed on a message board and a display device;
in response to determining that the content of the verbal input is not escalatory, selecting a predefined message from a database of predefined messages based on the content of the verbal input, wherein the predefined message matches the content of the verbal input;
generating, based on the predefined message and the user data, a display message; and
causing, automatically, the display message to be displayed on the message board and the display device, wherein the message board is configured to display the display message facing an exterior of the vehicle, wherein the display device is configured to display the display message to a user within the vehicle, wherein the display device is spaced apart from the message board, and wherein causing the display message to be displayed automatically on the message board and the display device, comprises:
wirelessly transmitting the display message from a remote that is removably couplable to the vehicle at a position spaced apart from the display device and the message board;
causing the display message to be automatically displayed on the message board in response to transmitting the display message from the remote; and
causing the display message to be automatically displayed on the display device in response to transmitting the display message from the remote.

17. The method of claim 16, wherein the predefined message is selected based on a machine learning algorithm.

18. The method of claim 16, wherein causing the display message to be displayed comprises using a remote to generate the display message, wherein the remote is removably couplable to the vehicle at a position spaced apart from the display device and the message board.

19. The method of claim 16, further comprising:
capturing, by a camera, a camera view of an exterior environment behind the vehicle; and
causing the camera view to be displayed on the display device, wherein automatically displaying the message on the display device includes causing the display message to be superimposed over the camera view.

20. The method of claim 19, wherein the camera is a 360-degree camera, and wherein the camera view is a 360-degree camera view.

* * * * *